(12) United States Patent
Wu et al.

(10) Patent No.: US 6,665,462 B2
(45) Date of Patent: Dec. 16, 2003

(54) OPTICAL SWITCH

(75) Inventors: Kun-Tsan Wu, Tu-Chen (TW); Shang Chin Liao, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 149 days.

(21) Appl. No.: 10/017,606

(22) Filed: Dec. 13, 2001

(65) Prior Publication Data

US 2003/0072520 A1 Apr. 17, 2003

(30) Foreign Application Priority Data

Oct. 17, 2001 (TW) .......................................... 90125719

(51) Int. Cl.[7] .............................. G02B 6/26; G02B 6/42
(52) U.S. Cl. .......................................... 385/18; 385/16
(58) Field of Search .................. 385/16, 18; 398/45; 359/197, 212, 223, 877

(56) References Cited

U.S. PATENT DOCUMENTS

| | | | | |
|---|---|---|---|---|
| 5,436,986 A | * | 7/1995 | Tsai .............................. | 385/16 |
| 5,742,712 A | * | 4/1998 | Pan et al. ..................... | 385/18 |
| 6,320,996 B1 | * | 11/2001 | Scobey et al. ................ | 385/18 |
| 6,385,364 B1 | * | 5/2002 | Abushagur .................... | 385/16 |
| 6,404,969 B1 | * | 6/2002 | Tayebati et al. ............. | 385/140 |
| 6,522,801 B1 | * | 2/2003 | Aksyuk et al. ............... | 385/18 |
| 6,574,026 B2 | * | 6/2003 | Jin et al. ..................... | 359/224 |
| 6,587,614 B2 | * | 7/2003 | Liao et al. .................... | 385/18 |
| 2003/0081885 A1 | * | 5/2003 | Chen ............................ | 385/18 |

FOREIGN PATENT DOCUMENTS

JP           2001305444 A   * 10/2001   .......... G02B/26/08

* cited by examiner

*Primary Examiner*—Brian Healy
*Assistant Examiner*—Daniel Petkovsek
(74) *Attorney, Agent, or Firm*—Wei Te Chung

(57) ABSTRACT

An optical switch (1) includes a first collimator (5) retaining a first input fiber (11) and a second output fiber (13), a second collimator (6) retaining a first output fiber (12) and a second input fiber (14), a switching element (30), a driving device (40), and a base (50). The switching element has a third reflector (33) fixed to the base and a first and second reflectors (31, 32) attached to a moveable block (41). The driving device moves the first and the second reflectors between a first position and a second position. The switching element switches light signals coming from the first and second input fibers between the first and second output fibers depending on whether the first and second reflectors reflect the light (in the first position) or whether the third reflector reflects the light (in the second position).

20 Claims, 11 Drawing Sheets

OPTICAL SWITCH

BACKGROUND OF THE INVENTION

1. Field of the Invention

The present invention relates to an optical switch for use in fiber communication and optical network technology, and particularly to a mechanical optical switch with three reflecting surfaces as a switching element.

2. Description of Related Art

Optical signals are commonly transmitted in optical fibers, which provide efficient light channels through which the optical signals can pass. Recently, optical fibers have been used in various fields, including telecommunications, where light passing through an optic fiber is used to convey either digital or analog information. Efficient switching of optical signals between individual fibers is necessary in most optical processing systems or networks to achieve the desired routing of the signals.

In fiber optic systems, various methods have been previously developed for switching optical signals between fiber cables. In these previously developed methods, one important category is mechanical optical switch.

Mechanical optical switches come in two different designs: where the optical components move, and where the fibers move. Factors for assessing the capability of an optical switch include low insertion loss (<1 dB), good isolation performance (>50 dB) and bandwidth capacity compatible with optical fibers.

Moving fiber switches involve the actual physical movement of one or more of the fibers to specific positions to accomplish the transmission of a beam of light from one fiber end to another under selected switching conditions. Moving optical component switches, on the other hand, include optical collimating lenses which expand the beam of light from the fibers, and then, using moving prisms or mirrors, reswitch the expanded beam as required by the switching process.

The moving fiber switches have a stringent tolerance requirement for the amount and direction of fiber movement. The tolerance is typically of a small portion of the fiber core diameter for two fibers to precisely align to reduce loss. The fibers themselves are quite thin and may be subject to breakage if not properly protected. On the other hand, reinforcing the fibers with stiff protective sheaths makes the fibers less flexible, increasing the force required to manipulate each fiber into alignment. Thus these moving fiber optical switches share a common problem of requiring high precision parts to obtain precise positioning control and low insertion loss. This results in high costs and complicated manufacture of the switches. Moreover, frequently moving fibers to and fro is apt to damage or even break the fibers.

The moving optical component switches have less stringent movement control tolerance requirements because of the collimating lenses.

For example, referring to FIG. 10, U.S. Pat. No. 5,436,986 discloses a mechanical optical switch comprising a first and second input fibers 101, 103, a first and second output fibers 102, 104, a driving device 304 and a mirror assembly 200. The mirror assembly 200 includes a moveable block 203 and two mirrors 201, 202 assembled to the block 203. Each mirror has two reflecting surfaces for reflecting light signals from the input fibers 101, 103. The driving device 304 drives the mirror assembly 200 to move between a first position and a second position. When the mirror assembly 200 is in the first position, light signals from the first and second input fibers 101, 103 are directly transmitted to the corresponding second and first output fibers 104, 102. When the mirror assembly 200 is displaced to the second position, the mirror 201 reflects the light signals from the first input fiber 101 to the mirror 202, and then the mirror 202 reflects the light signals to the first output fiber 102; the mirror 202 reflects the light signals from the second input fiber 103 to the mirror 201, and then the mirror 201 reflects the light signals to the second output fiber 104. In this mechanical optical switch, when in the second position the light signals are reflected two times, which increases the difficulties of precise alignment between the input fibers 101, 103, mirrors 201, 202 and the output fibers 102, 104.

As illustrated in FIG. 11, U.S. Pat. No. 5,742,712 describes another mechanical optical switch, which relies on a moveable mirror 520 having two opposite reflecting surfaces being moved into an optical path between a first and second fixed collimating lenses 528, 536. When the moveable mirror 520 is displaced out of the optical path, the light signals from a first and second input fibers 522, 530 are directly transmitted to a corresponding second and first output fibers 532, 524. However, when the moveable mirror 520 is moved into the optical path, the signals from the first and second input fibers 522, 530 are reflected to the corresponding first and second output fibers 524, 532.

In this mechanical optical switch, the insertion of the mirror 520 will introduce an insertion loss between the input fibers 522, 530 and the output fibers 524, 532 attributable to a thickness between the two opposite reflecting surfaces of the moveable mirror 520.

For the above reasons, an improved optical switch is desired. In particular, an optical switch is desired which has high optical efficiency, is easy to align, and does not require movement of the optical fibers themselves.

SUMMARY OF THE INVENTION

An object of the present invention is to provide an optical switch which is easy to align and has a low insertion loss.

Another object of the present invention is to provide an optical switch which uses three reflecting surfaces as a switching element.

An optical switch in accordance with the present invention comprises a first collimator retaining a first input fiber and a second output fiber, a second collimator retaining a first output fiber and a second input fiber, a switching element, a driving device, a moveable arm, a moveable block, a base and two supporting elements assembled onto the base for fixing the first and second collimators thereon.

The switching element comprises a reflector assembly and a third reflector. The reflector assembly is mounted on the moveable block and includes a first reflector and a second reflector. The third reflector is fixed on the base and can reflect light from the first collimator to the second collimator.

The driving device drives the moveable arm to move the reflector assembly fixed on the moveable block between a first position and a second position. When in the first portion, the first and second reflectors reflect light from the first input fiber to the second output fiber, and from the second input fiber to the first output fiber, respectively. When the reflector assembly is in the second portion, the third reflector reflects light from the first input fiber to the first output fiber, and from the second input fiber to the second output fiber.

Other objects, advantages and novel features of the invention will become more apparent from, the following detailed description when taken in conjunction with the accompanying drawings.

DETAILED DESCRIPTION OF THE INVENTION

Figure 1:
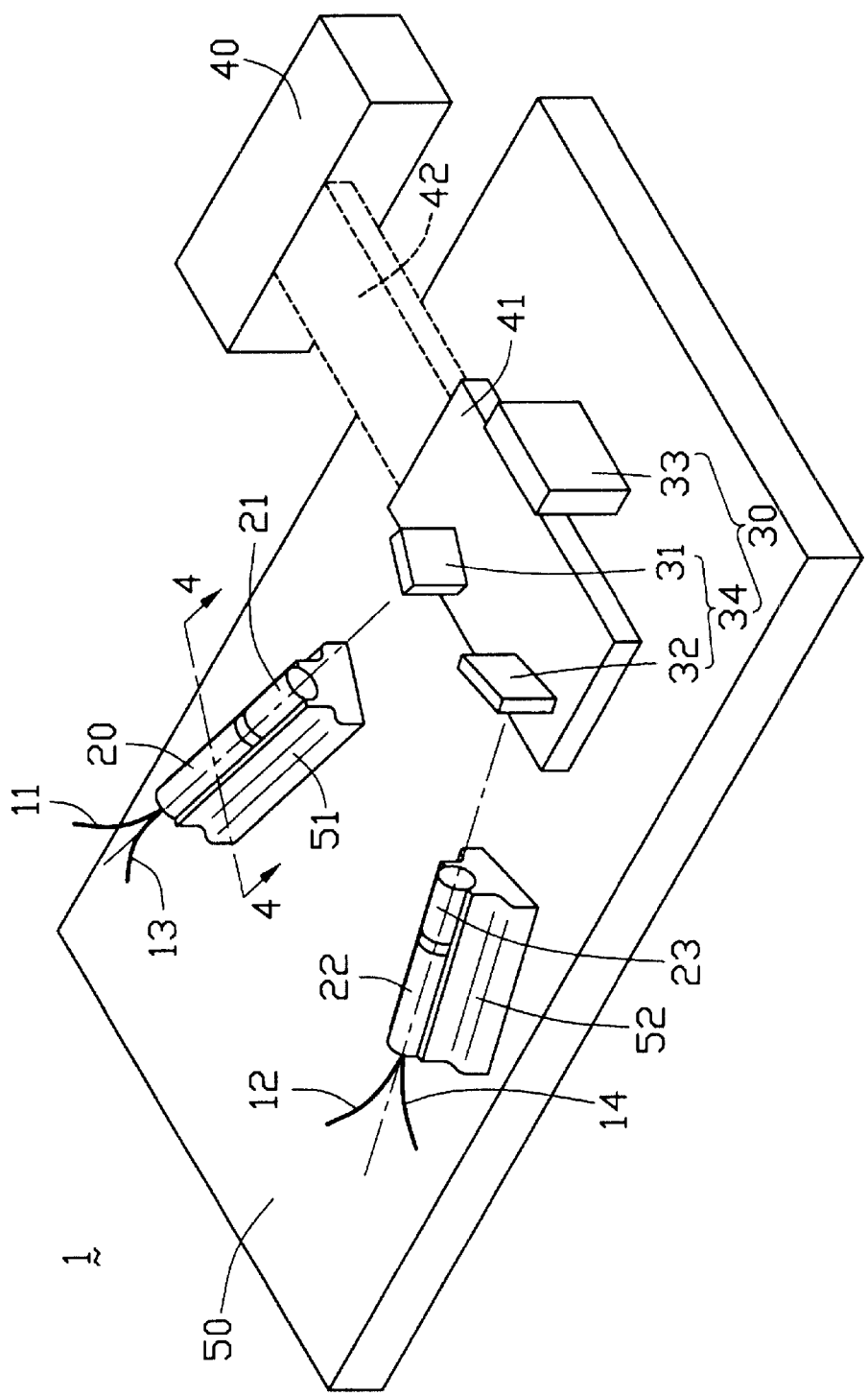
FIG. 1 is a perspective view of an optical switch according to the present invention.
Figure 2:
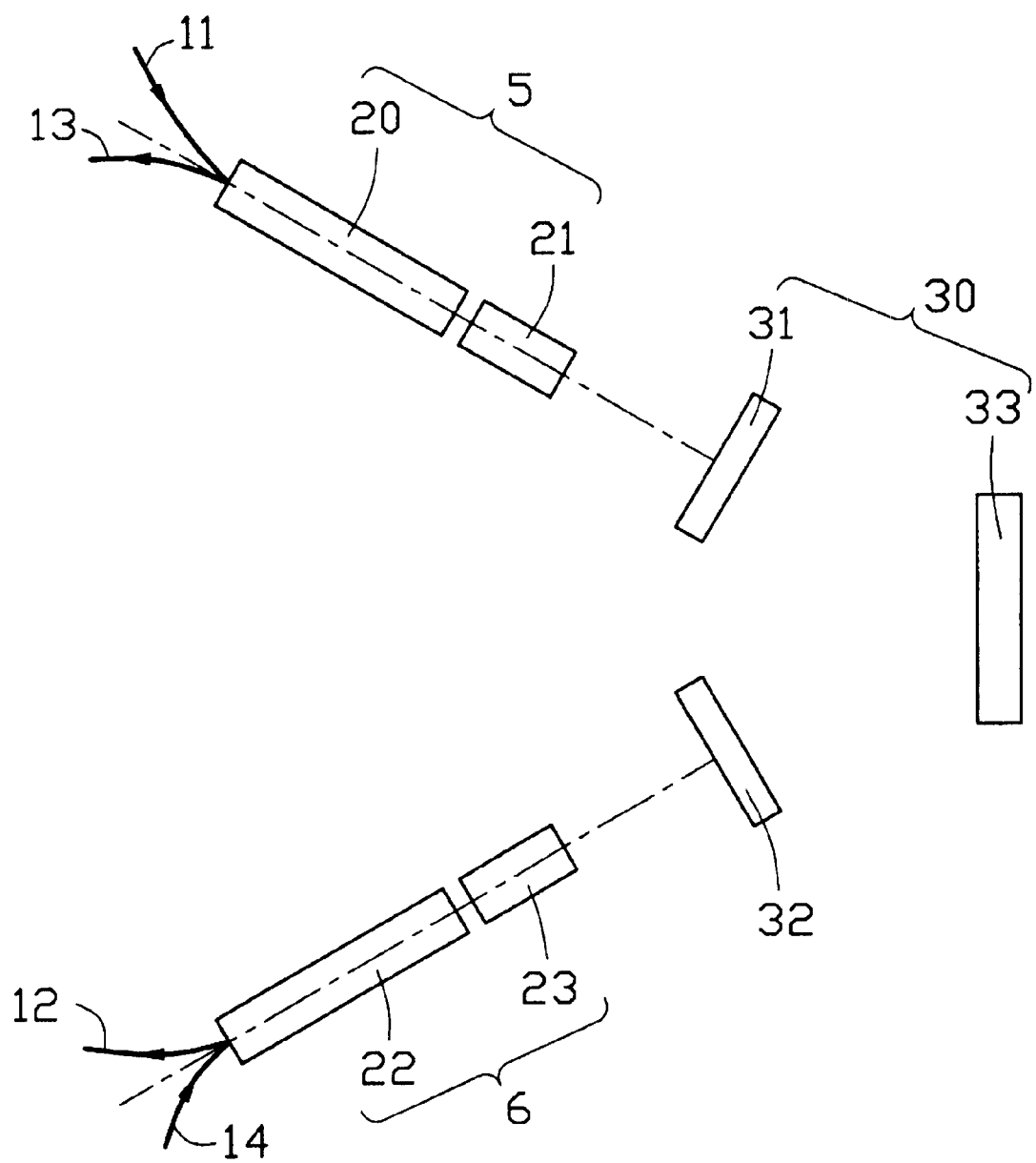
FIG. 2 is a schematic diagram of the optical switch of FIG. 1 with a reflector assembly in a first position.

Referring to FIGS. 1 and 2, an optical switch 1 comprises a first collimator 5 retaining a first input fiber 11 and a second output fiber 13, a second collimator 6 retaining a first output fiber 12 and a second input fiber 14, a switching element 30, a driving device 40, a moveable arm 42, a moveable block 41, a base 50 and two supporting elements 51, 52 assembled onto the base 50 for fixing the first and second collimators 5, 6 thereon.

Figure 4:
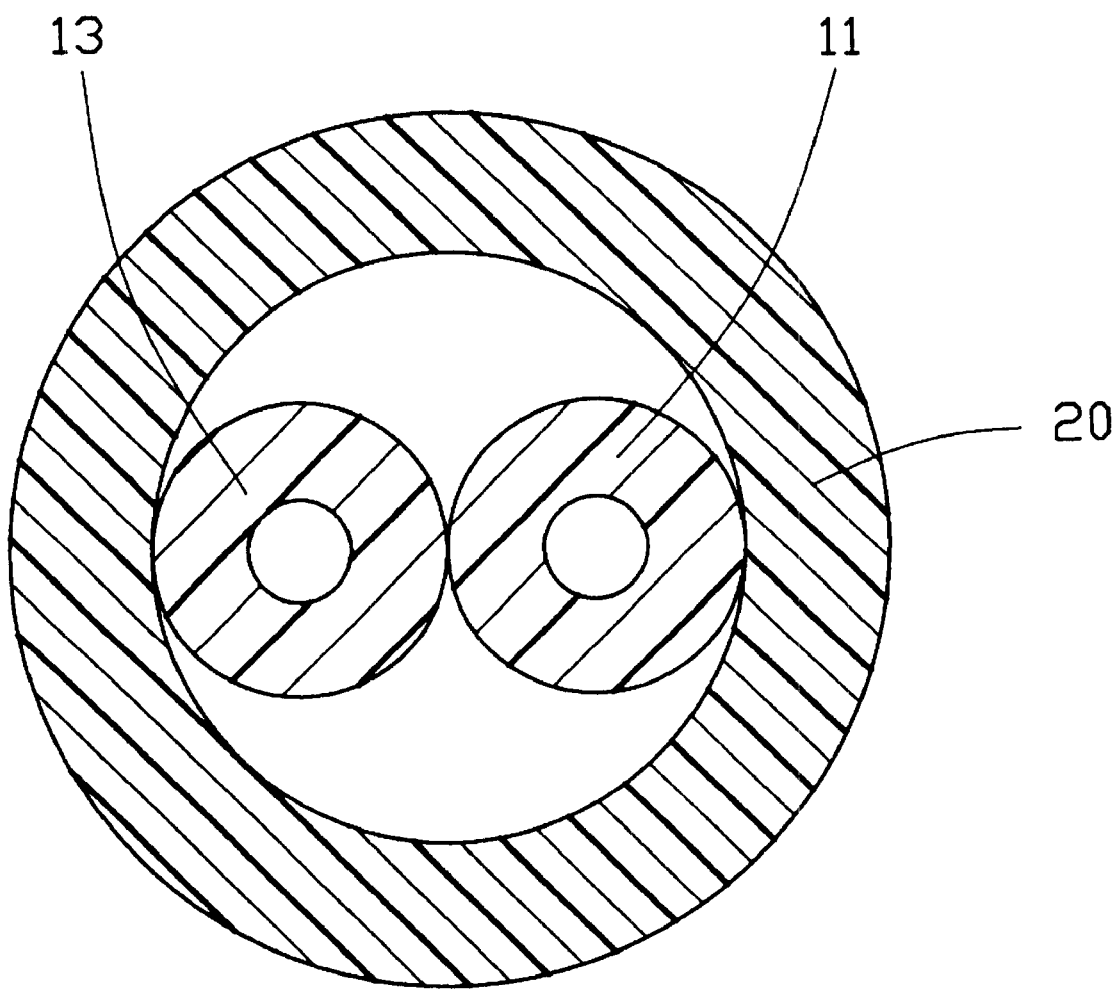
FIG. 4 is a cross-sectional view of a ferrule of the optical switch taken along line 4—4 of FIG. 1.

Also referring to FIG. 4, the first collimator 5 comprises a ferrule 20 and a GRIN lens 21. The first input fiber 11 and the second output fiber 13 are fixedly positioned parallel to one another in the ferrule 20 which has a hollow interior (not labeled). The GRIN lens 21 is adjacent to the ferrule 20 and aligns with the ferrule 20.

The second collimator 6 is similar to the first collimator 5, which comprises a ferrule 22 and a GRIN lens 23. The first output fiber 12 and the second input fiber 13 are fixed positioned parallel to one another in the ferrule 22 which also has a hollow interior, in the same manner as is shown in FIG. 4. The GRIN lens 23 is adjacent to the ferrule 22 and aligns with the ferrule 22.

The switching element 30 comprises a reflector assembly 34 and a third reflector 33. The reflector assembly 34 is mounted on the moveable block 41 and includes a first reflector 31 and a second reflector 32. The third reflector 33 is preferably fixed on the base 50 and can reflect light from the first collimator 5 to the second collimator 6 and from the second collimator 6 to the first collimator 5.

The driving device 40 drives the moveable arm 42 to move the moveable block 41 on which the reflector assembly 34 is fixed. The reflector assembly 34 is thus moveable between a first position and a second position.

Figure 6:
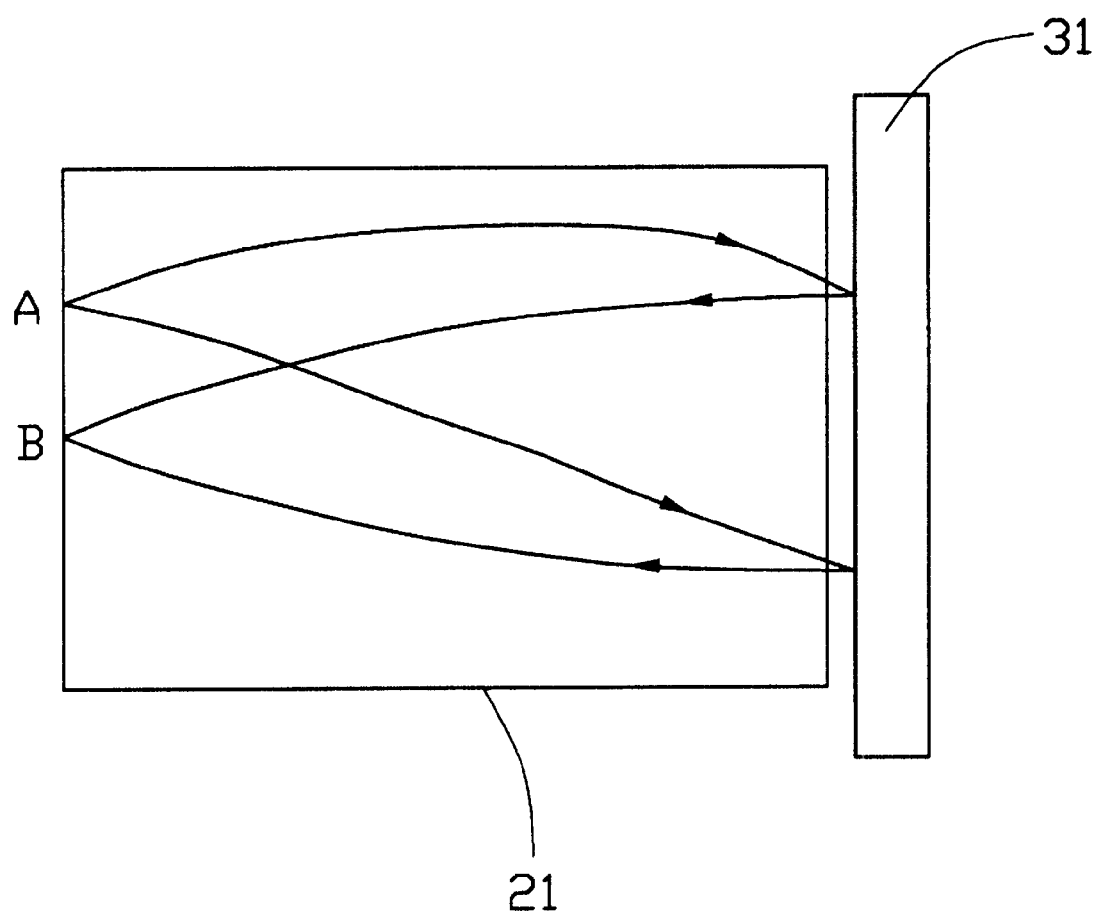
FIG. 6 is a beam trace in a GRIN lens of the optical switch of FIG. 1 when the reflector assembly is in the first position shown in FIG. 2.

As shown in FIG. 2, when the reflector assembly 34 of the switching element 30 is positioned in the first position, the first reflector 31 reflects the light from the first input fiber 11 to the second output fiber 13, and the second reflector 32 reflects the light from the second input fiber 14 to the first output fiber 12. Also referring to FIG. 6, the light from point A (the first input fiber 11) is transmitted through the GRIN lens 21 and is reflected by the first reflector 31 to retransmit through the GRIN lens 21 to point B (the second output fiber 13). Light transmits through the GRIN lens 23 in a mirror image of the pattern shown in FIG. 6.

Figure 3:
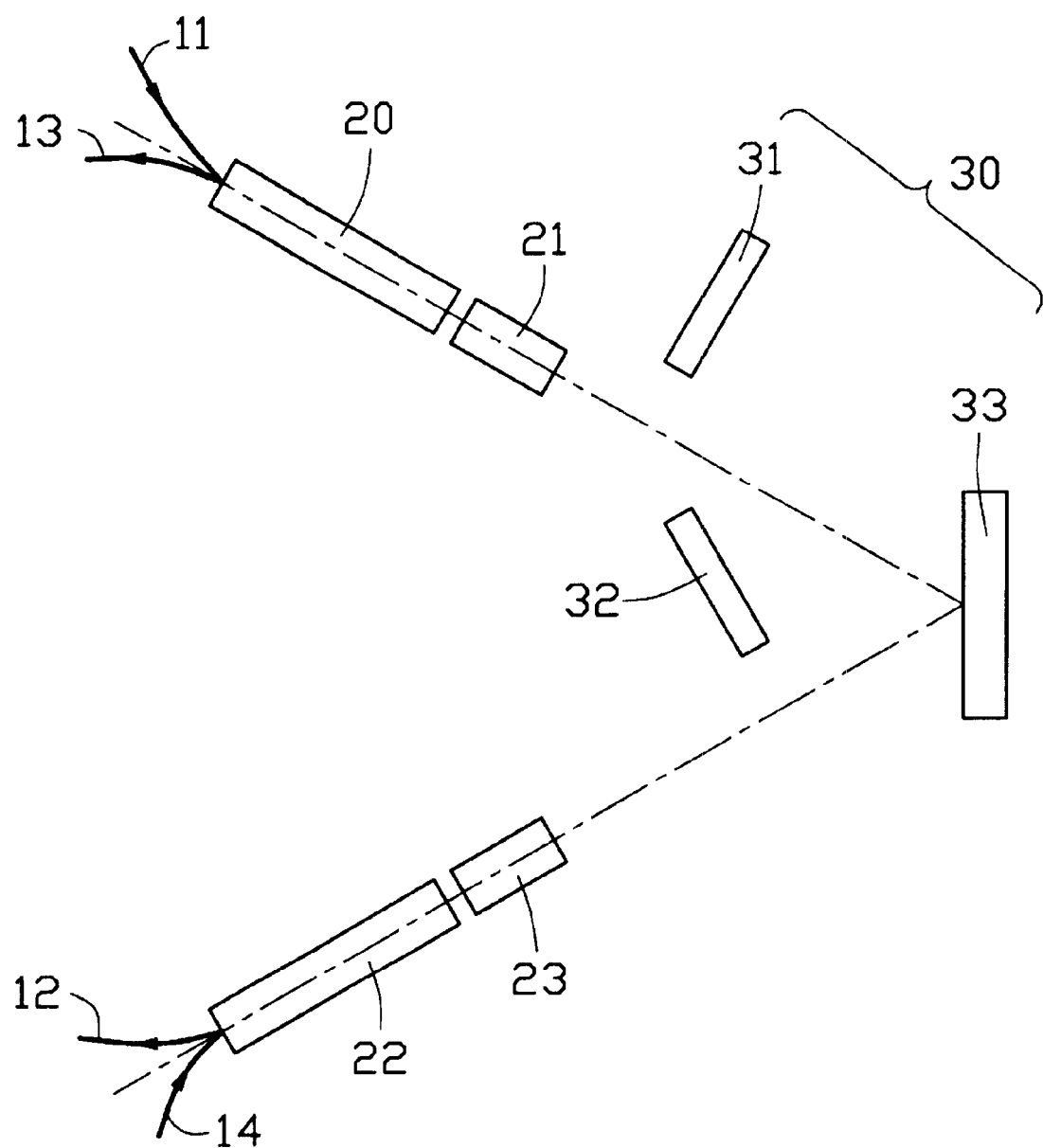
FIG. 3 is a schematic diagram of the optical switch of FIG. 1 with the reflector assembly in a second position.
Figure 5:
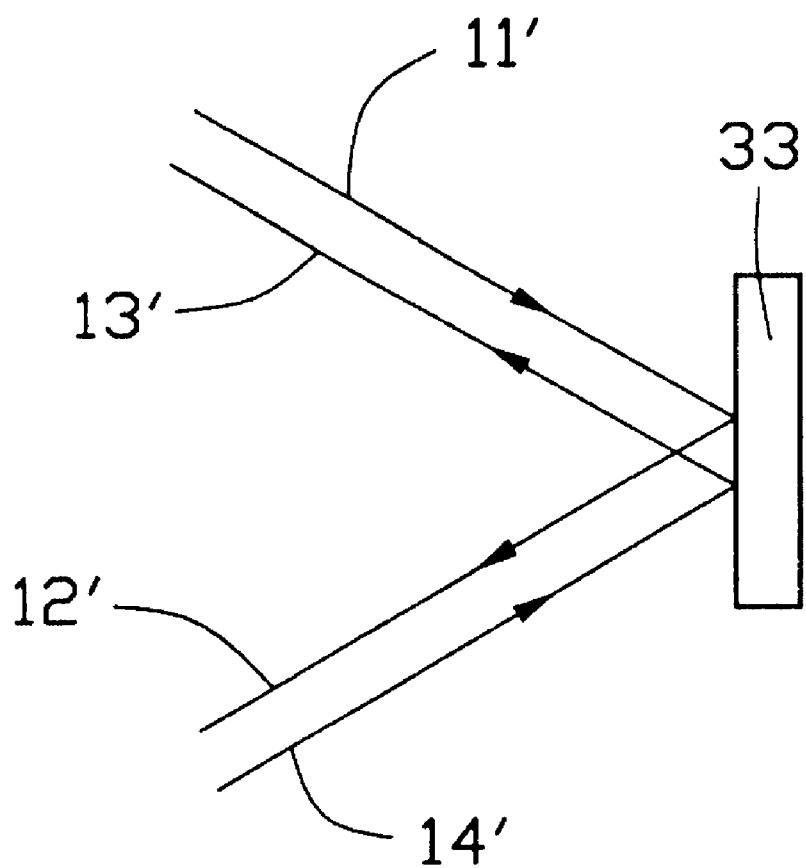
FIG. 5 is an essential optical paths diagram of the optical switch of FIG. 1 when the reflector assembly is in the second position shown in FIG. 3.

As shown in FIG. 3, when the reflector assembly 34 of the switching element 30 is positioned in the second position, the light from the first and second input fibers 11, 14 is transmitted through the GRIN lenses 21, 23, respectively, is reflected by the third reflector 33, and is transmitted through the GRIN lenses 23, 21, respectively, to the corresponding first and second output fibers 12, 13. This is shown schematically in FIG. 5, where the light from the GRIN lens 21, 23 travels along optical paths 11', 14', respectively, is reflected by the third reflector 33, and travels along optical paths 12', 13' to the corresponding GRIN lenses 23, 21.

Figure 7:
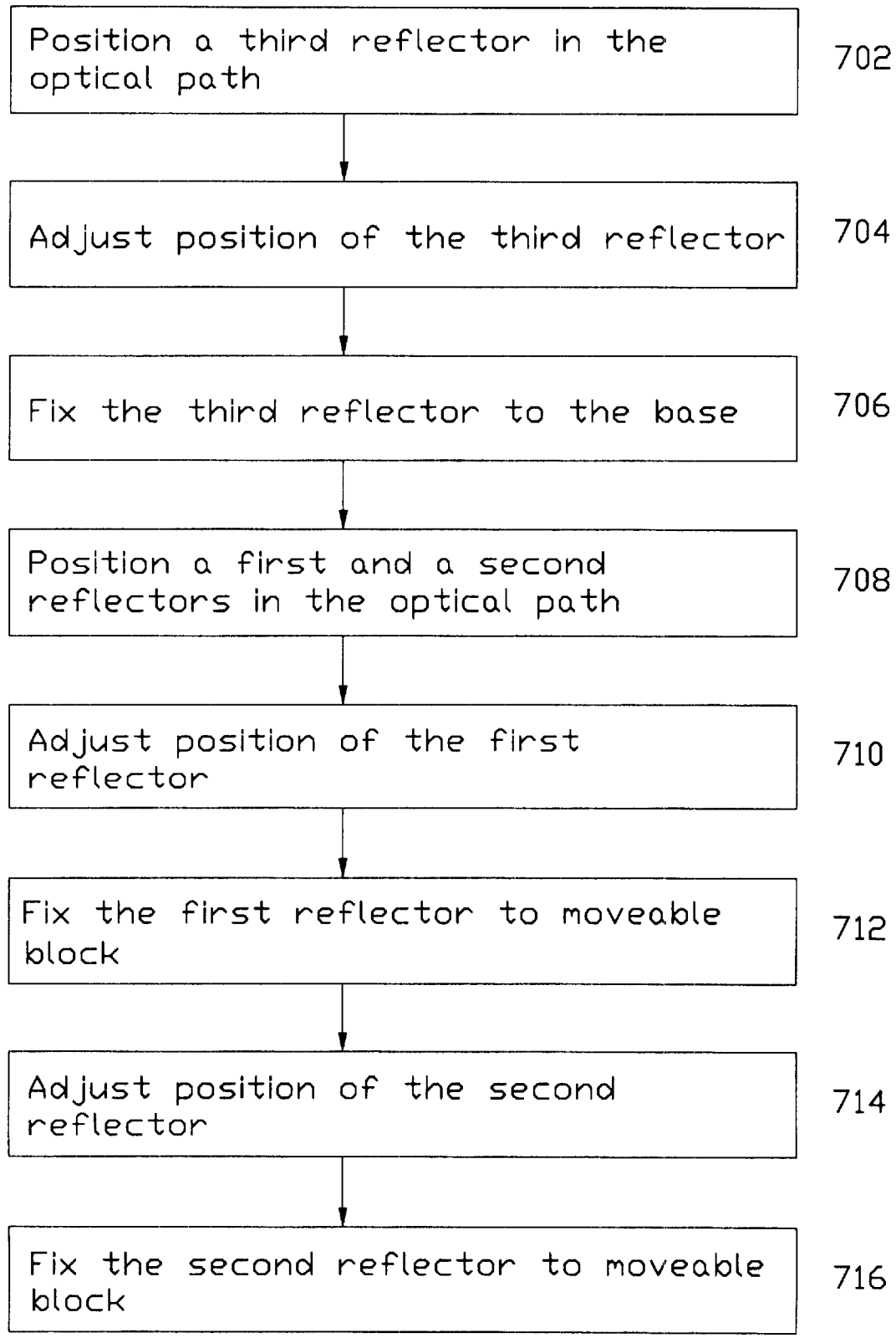
FIG. 7 is a flow chart for aligning a switching element of the optical switch of FIG. 1.

FIG. 7 is a flow chart for aligning the switching element 30 of the optical switch 1 comprising the steps of:

Step 702: positioning the third reflector 33 in the optical path, and positioning the reflector assembly 34 in the second position;

Step 704: Adjusting the third reflector 33 so that the light transmitted from the first and second input fibers 11, 14 is reflected by the third reflector 33 to the first and second output fibers 12, 13, respectively;

Step 706: Fixing the third reflector 33 to the base 50;

Step 708: moving the reflector assembly 34 to the first position so that the first and second reflectors 31, 32 are in the optical path;

Step 710: Adjusting the first reflector 31 so that the light from the first input fiber 11 is reflected by the first reflector 31 to the second output fiber 13;

Step 712: Fixing the first reflector 31 to the moveable block 41;

Step 714: Adjusting the second reflector 32 so that the light from the second input fiber 14 is reflected by the second reflector 32 to the first output fiber 12; and Step 716: Fixing the second reflector 32 to the moveable block 41.

Figure 8:
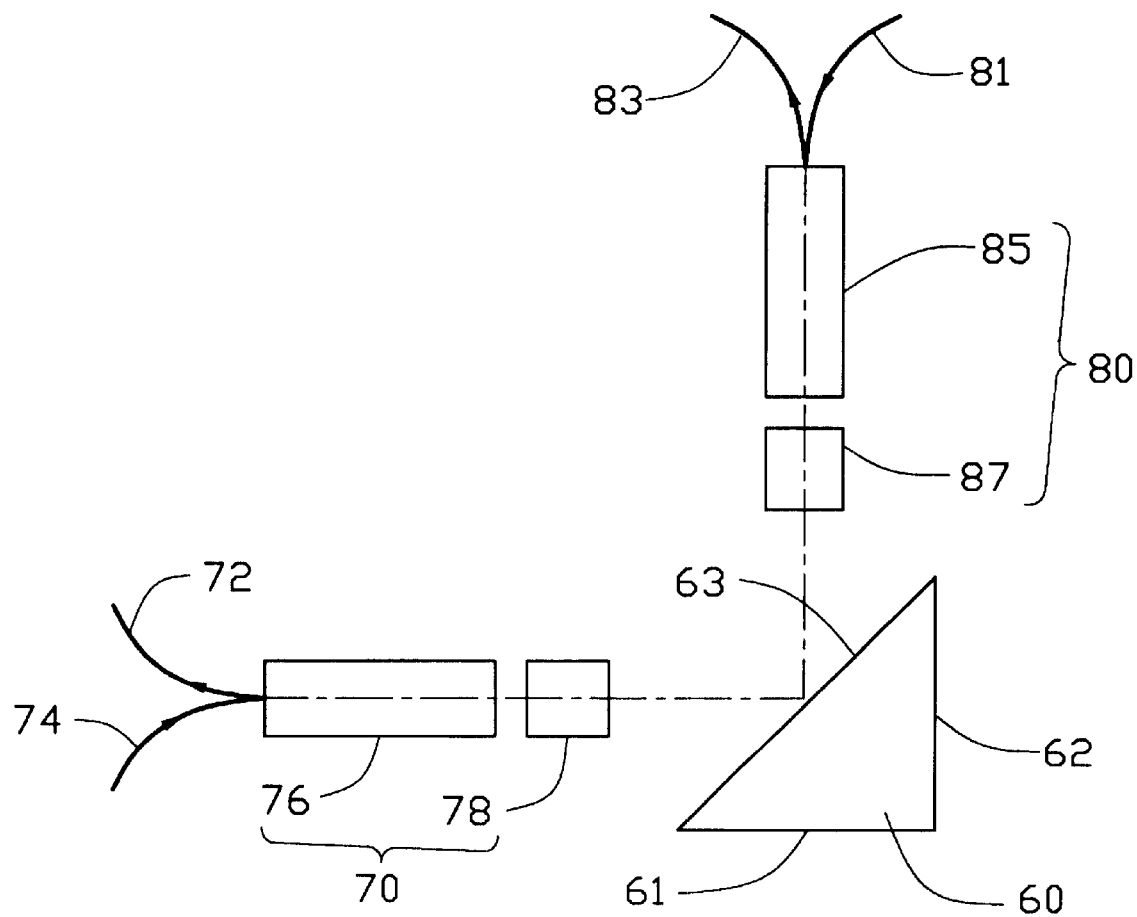
FIG. 8 is a schematic diagram of a second embodiment of an optical switch with a switching element in a second position.
Figure 9:
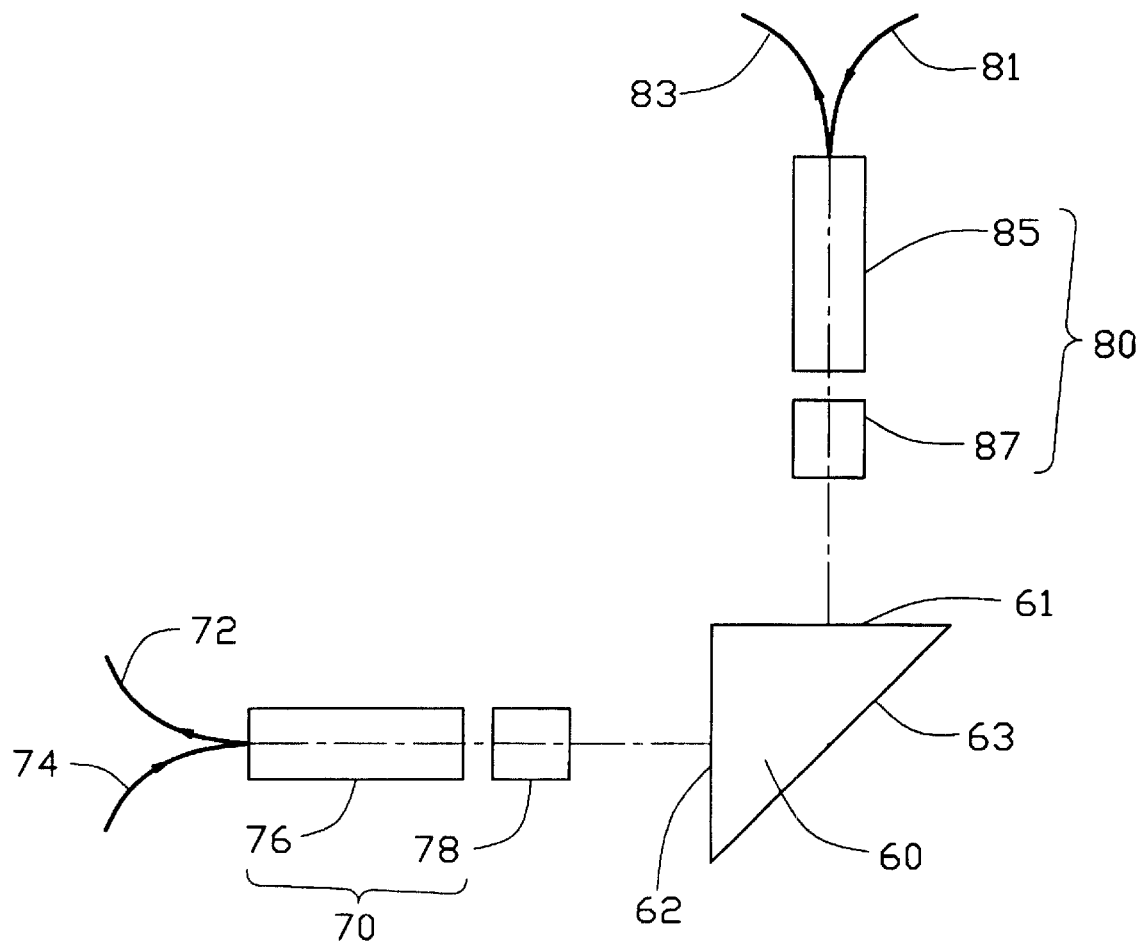
FIG. 9 is a schematic diagram of the second embodiment of the optical switch with the switching element in a first position.
Figure 10:
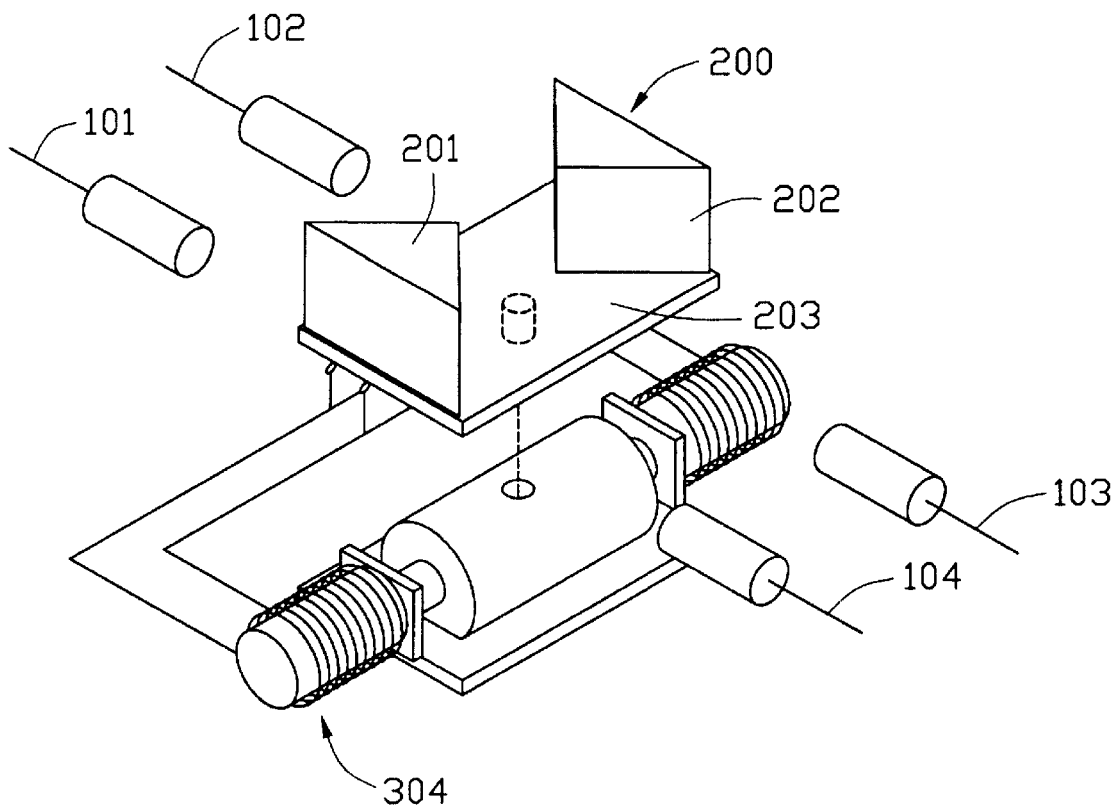
FIG. 10 a perspective view of a prior art optical switch.
Figure 11:
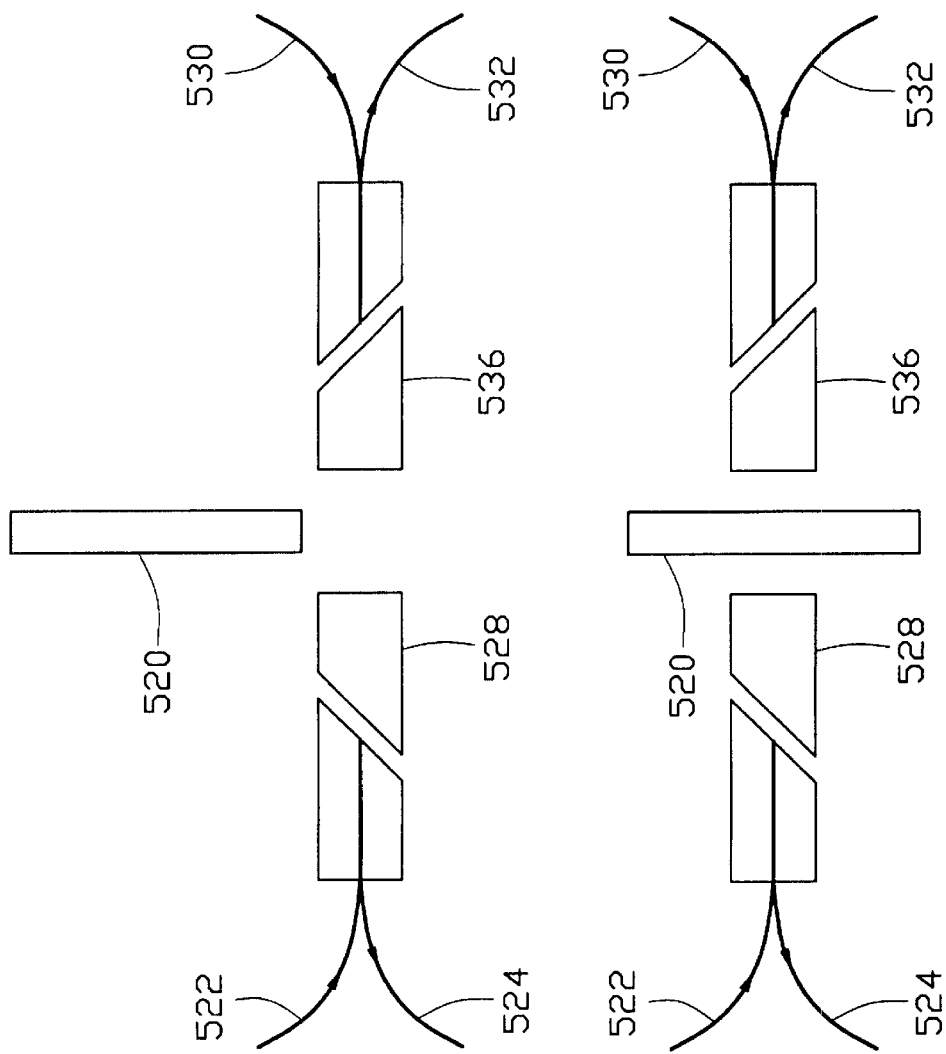
FIG. 11 a schematic diagram of another prior art optical switch.

FIGS. 8 and 9 show a second embodiment of an optical switch which is designed with a switching element 60. The switching element 60 has a first reflecting surface 61, a second surface 62 and a third reflector 63. The collimators 80, 70 are similar to the collimators 5, 6, having ferrules 85, 76 and GRIN lenses 87, 78.

Referring to FIG. 8, the switching element 60 is positioned in a second position. The light from a first and second input fibers 81, 74 is reflected by the third reflecting surface 63 to a first and second output fibers 72, 83, respectively.

Referring to FIG. 9, the switching element 60 is positioned in a first position. The light from the first and second input fibers 81, 74 is respectively reflected by the first and second reflecting surfaces 61, 62 to a corresponding second and first output fibers 83, 72.

The optical switch 1 of the present invention is easy to align and also eliminates the insertion loss attributable to a two-sided mirror. The use of those reflecting surfaces yield, a simple optical switch is easy to assemble.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical switch for switching light signals coming from a first and second input fibers between a first and second output fibers, comprising:

a first collimator retaining the first input fiber and the second output fiber;

a second collimator retaining the second input fiber and the first output fiber;

a reflector assembly having a first reflector and a second reflector, the reflector assembly being moveable between a first position and a second position; and a third reflector in a fixed position relative to the first and second collimators;

whereby, when the reflector assembly is in the first position, the light signals from the first and second input fibers are reflected by the corresponding first and second reflectors to the corresponding second and first output fibers, and when the reflector assembly is displaced to the second position, the light signals from the first and second input fibers are reflected by the third reflector to the corresponding first and second output fibers.

2. The optical switch as claimed in claim 1, wherein the first collimator comprises a ferrule and a GRIN lens.

3. The optical switch as claimed in claim 2, wherein the ferrule retains the first input fiber and the second output fiber.

4. The optical switch as claimed in claim 1, wherein the second collimator comprises a ferrule and a GRIN lens.

5. The optical switch as claimed in claim 4, wherein the ferrule retains the second input fiber and the first output fiber.

6. The optical switch as claimed in claim 1, further comprising a driving device, wherein the driving device drives the reflector assembly to move between the first position and the second position.

7. The optical switch as claimed in claim 6, further comprising a moveable block, wherein the first and second reflectors are arranged on the moveable block.

8. An optical switch for switching light signals coming from first and second input fibers toward first and second output fibers, comprising:

a first collimator retaining the first input fiber and the second output fiber;

a second collimator retaining the second input fiber and the first output fiber;

a switching element comprising a first reflector, a second reflector and a third reflector, the switching element being moveable between a first position and a second position;

whereby, when the switching element is in the first position, light signals from the first and second input fibers are reflected by the corresponding first and second reflectors to the corresponding second and first output fibers, and when the switching element is displaced to the second position, the light signals from the first and second input fibers are reflected by the third reflector to the corresponding first and second output fibers.

9. The optical switch as claimed in claim 8, further comprising a driving device, which drives the switching element to move between the first position and the second position.

10. The optical switch as claimed in claim 8, wherein the first collimator comprises a ferrule and a GRIN lens.

11. The optical switch as claimed in claim 10, wherein the ferrule retains the first input fiber and the second output fiber.

12. The optical switch as claimed in claim 8, wherein the second collimator comprises a ferrule and a GRIN lens.

13. The optical switch as claimed in claim 12, wherein the ferrule retains the second input fiber and the first output fiber.

14. The optical switch as claimed in claim 9, further comprising a moveable block, the first and second reflectors being arranged thereon.

15. The optical switch as claimed in claim 14, wherein the driving device drives the moveable block to move between the first position and the second position.

16. An optical switch for switching light signals coming from a first and second input fibers between a first and second output fibers, comprising:

a first collimator retaining the first input fiber and the second output fiber;

a second collimator retaining the second input fiber and the first output fiber;

a switching element having a first reflecting surface, a second reflecting surface and a third reflecting surface, the switching element being moveable between a first position and a second position;

whereby, when the switching element is in the first position, light signals from the first and second input fibers are reflected by the corresponding first and second reflecting surfaces to the corresponding second and first output fiber, and when the switching element is displaced to the second position, the light signals from the first and second input fibers are reflected by the third reflecting surface to the corresponding first and second output fibers.

17. The optical switch as claimed in claim 16, wherein the first collimator comprises a ferrule and a GRIN lens.

18. The optical switch as claimed in claim 17, wherein the ferrule retains the first input fiber and the second output fiber.

19. An optical switch assembly comprising:

a first collimator retaining one input fiber and one output fiber and one GRIN lens;

a second collimator retaining another input fiber and another output fiber and another GRIN lens;

said first collimator and said second collimator being arranged in a non-parallel converged manner where a converging region located beside said GRIN lenses, is defined by a light path transmitted between said first collimator and said second collimator with a converging point at an apex thereof;

switching device positioned around said converging region, said switching device providing:

a first reflection surface either fixedly or moveably located at said converging point so as to achieve mutual reflection of both said first collimator and said second collimator where light from said one input fiber leaves from said another output fiber while light from said another input fiber leaves from said one output; and second and third reflection surfaces substantially moveably located respectively between the converging point and said first and second collimators to interrupt light paths thereof so as to achieve self-reflection of both said first collimator and said second collimator where light from said one input fiber leaves from said one input fiber while light from said another input fiber leaves from said another output fiber.

20. The switch assembly as claimed in claim 19, wherein both said first collimator and said second collimator are located at the same side of said first reflection surfaces.

* * * * *